United States Patent [19]

Denton

[11] Patent Number: 4,520,262

[45] Date of Patent: May 28, 1985

[54] PHOTOELECTRIC SAFETY SCREEN WITH STRAY SOURCE DETECTION

[75] Inventor: Anthony D. Denton, Adelaide, Australia

[73] Assignees: Kenneth Ambler; Willy Raeder, both of Highbury, Australia

[21] Appl. No.: 558,603

[22] Filed: Dec. 6, 1983

Related U.S. Application Data

[63] Continuation of Ser. No. 261,170, filed as PCT AU80/00063, Sep. 10, 1980, published as WO81/00750, Mar. 19, 1981, § 102(e) date Apr. 30, 1981

[30] Foreign Application Priority Data

Jun. 10, 1980 [AU] Australia .............................. 0423/79

[51] Int. Cl.³ ............................................ G01V 9/04
[52] U.S. Cl. .................................... 250/221; 340/556
[58] Field of Search ..................... 250/221, 222.1, 551; 340/555, 556, 557

[56] References Cited

U.S. PATENT DOCUMENTS

| | | | |
|---|---|---|---|
| 3,136,926 | 6/1964 | Smith | 250/551 |
| 3,704,396 | 11/1972 | MacDonald | 250/221 |
| 3,970,846 | 7/1976 | Schofield | 250/221 |
| 4,243,879 | 1/1981 | Carroll et al. | 250/221 |
| 4,247,767 | 1/1981 | O'Brien et al. | 250/221 |
| 4,249,074 | 2/1981 | Zettler et al. | 340/556 |

Primary Examiner—David C. Nelms
Attorney, Agent, or Firm—Oldham, Oldham & Weber Co.

[57] ABSTRACT

This invention relates to safety apparatus intended for use in conjunction with industrial machinery especially of a type such as presses and guillotines. The invention employs a radiant energy safety screen with the ability to detect the presence of extraneous radiation or a failure of radiant energy sources or detectors.

3 Claims, 8 Drawing Figures

PHOTOELECTRIC SAFETY SCREEN WITH STRAY SOURCE DETECTION

This is a continuation of application Ser. No. 261,170 filed as PCT AU 80/00063, Sep. 10, 1980, published as WO 81/00750, Mar. 19, 1981, §102(e) date Apr. 30, 1981 now abandoned.

While reference is made to the use of this invention in connection with industrial machinery, it is to be clear that the concept is not necessarily limited to simply being applied in respect of industrial machinery and at least the broader concepts are intended to be universally applicable.

Application such as intrusion alarm systems are also possible with this invention.

It is known to use beams of focussed light in spatial detection apparatus, the light being produced by means of incandescent bulbs arranged in a row on one side of the space to be monitored, said bulbs being arranged to project light onto a corresponding row of photo-electric detection devices located at the opposite side of the space to be monitored.

Such arrangements suffer because it is difficult to confine the light from the incandescent bulbs so that this will only fall on the corresponding one detector and even slight dislodgement of lenses or other devices needed to assist in this isolation can lead to the guard being ineffective.

Likewise the cost in providing the lenses and having these constantly monitored to ensure that they are safe is a disadvantage.

The object of this invention is to generally mitigate some of the problems expressed above.

Other aspects of the invention relate to providing for a very safe combination of detection devices suitable for guarding machinery especially of a type such as press brakes, guillotines or presses.

According to one form of this invention then this can be said to reside in the method of detection of opaque members within a detection space which is characterised according to this invention in that it includes the steps of sequentially effecting a radiant energy transmission across a detection space from a plurality of spaced apart sources and causing a detection observed signal when such transmission is not sufficiently detected at each of a plurality of correspondingly located and sequentially correspondingly selected locations.

In a further form, it can be said to reside in a method of detecting opaque objects when such an object is in a detection space between selected transmission and detection members, the members comprising a plurality of radiant energy transmitters and receivers aligned as pairs across the detection space, the method according to this invention being characterised by including the steps of activating all transmitters during a selected period of time but only one or some but not all during a smaller period of time within the selected overall period of time and interrogating corresponding receivers at least within the period of activation of each oppositely located transmitter and effecting a detection observed signal if the transmitted beam is not adequately received by the corresponding receiver during the mutually effective period.

This in one form then conceives sequentially activating both a transmitter and a receiver pair and this therefore enables a designer to place adjacent transmitters and receivers in very close vicinity and the transmitter effect on any other receiver than that activated will be of no consequence.

There is therefore immediately a much greater flexibility in the design and much less if any need to incorporate condensers to align any radiation from the transmitters.

One difficulty with the arrangement described is the fact that if there is an alternate radiant energy source, the detector could be inadvertently activated during its activation period even though an obstacle is across the transmitter beam.

It is therefore a preferred feature and it is regarded as an important feature that each of the receivers is interrogated at least during some period other than the mutually activated period between the transmitter and receiver, and arranging that a stray source detected signal is effected if a selected level of radiant energy is "seen" during this other period.

In practice then this stray source detected signal can be used to de-activate the system until any interfering outside energy source is removed.

Such an arrangement is conventionally used to detect an intrusion into a dangerous zone of industrial machinery such as a press or guillotine.

It is advantageous that such detecting apparatus or method not be operative during some cycle portion of some of these machines.

As an illustration, on the downstroke of a press, it is dangerous to have any intrusion into the operating area but this is not the case upon the upstroke.

Detectors are therefore proposed which detect the status in the cycle of the particular machine.

The problem however is that if any of the detectors fail then the guard effect becomes useless as the machine may well cycle through the operative and nonoperative strokes without limit.

It is conventional then to provide normally a detection device detecting a commencement of a power stroke or a down stroke and also a device to detect the lowermost position but the problem is to provide that in the event of failure of either of these devices this is very quickly detected and the machine rendered safe.

Accordingly, there is a first detector detecting a commencement of a downstroke, a second detector detecting completion of a downstroke and according to a preferred feature, a third detector at least, which detects the position of the operating member of the machine at least during the so called downstroke.

It is to be understood that the use of the word "downstroke" is merely illustrative and intended to indicate the cycle of a machine which is considered dangerous.

As such, it perhaps might be better to refer to this period of a cycle as the operating period but such definition is not intended to be limiting in any sense to the overall inventive concept in relation to this feature.

Consequentially then, if any of the machine cycle status detectors should fail, a dangerous situation could eventuate and it is therefore a further feature of this invention that in combination with apparatus to detect opaque objects when in a detection space between respective members of detecting means there shall be included such machine cycle status detection means related to the detection of the location of the operating member of the industrial machine there being at least three such detecting members two of which are to detect commencement and a finalization of an operative stroke and at least one other detection means responsive to the position of the operating member at least during the operating stroke, the invention characterised in that there are means arranged such that upon the change in state of a selected one of the detection means, this will activate a comparison of at least any two of the said detection means and if a state other than that expected is detected, then the means are arranged to effect a fault detected signal.

The problem with using any detection means as a safety device is that if any one of these devices should fail either by component failure or by mechanical failure in the event that the detection means is a switch, a very dangerous situation could exist especially where an operator becomes dependent upon relying on the intrusion detector means.

Because the various switches or detection means where these are not simply switches are themselves constantly in operation and changing state, it is generally a very difficult procedure to provide such significant safety.

The concept then is to provide a means whereby each of the two detection means are checked through each cycle of operation of the industrial machine by using what might be termed a further detection means or in a preferred instance a switch and have this effect what might be termed an interrogation of the state of the other two switches.

Fairly obviously, once the concept of an interrogation by a third switch is conceived, the various methods by which such interrogation can be effected will be apparent to those familiar with this art.

Accordingly in the preferred illustration which will subsequently be described, one particular interrogation system together with hardware will be described but it is to be clear that the invention is not to be taken as necessarily limited to such a precise description.

A further feature according to this invention in which may be considered at least in a preferable arrangement to be in combination with the previous features, involves the problem that in relation to industrial machinery of the type described it is sometimes necessary to provide a high voltage alternating current which couples with a low voltage direct current signal.

In a preferred arrangement, it is noted that a main relay control output is used to control significant AC voltage currents by reason of slave switching.

To detect the status of the AC controlling relay, the voltage appearing across the relay contacts can be examined but this of course will be high voltage and alternating.

To interface this critical portion of the circuit with the control circuit which has low voltage power supplies and which is sensitive to voltage differentials and voltage spikes has hitherto been a problem.

Accordingly, to avoid susceptibility of devices such as light emitting diodes, it has been discovered that all of these problems are overcome by connecting a gaseous discharge lamp such as a neon lamp across the contacts and then detecting the light output of this device by conventional solid state low voltage members.

Such devices are generally known and are usually called opto-couplers but in relation to conventional devices these comprise a light emitting diode with a photo-transistor in combination.

Such an arrangement however suffers from the disadvantage that transient voltages can connect through a voltage dropping capacitor coupled to the LED which can be sufficient to destroy the LED within the opto-coupler.

We have discovered that this problem can be overcome by providing a gaseous type lamp such as a neon lamp as the higher voltage sensitive light transmitter.

To assist in a better understanding of this invention this will now be described with the assistance of drawings in which.

Figure 1:
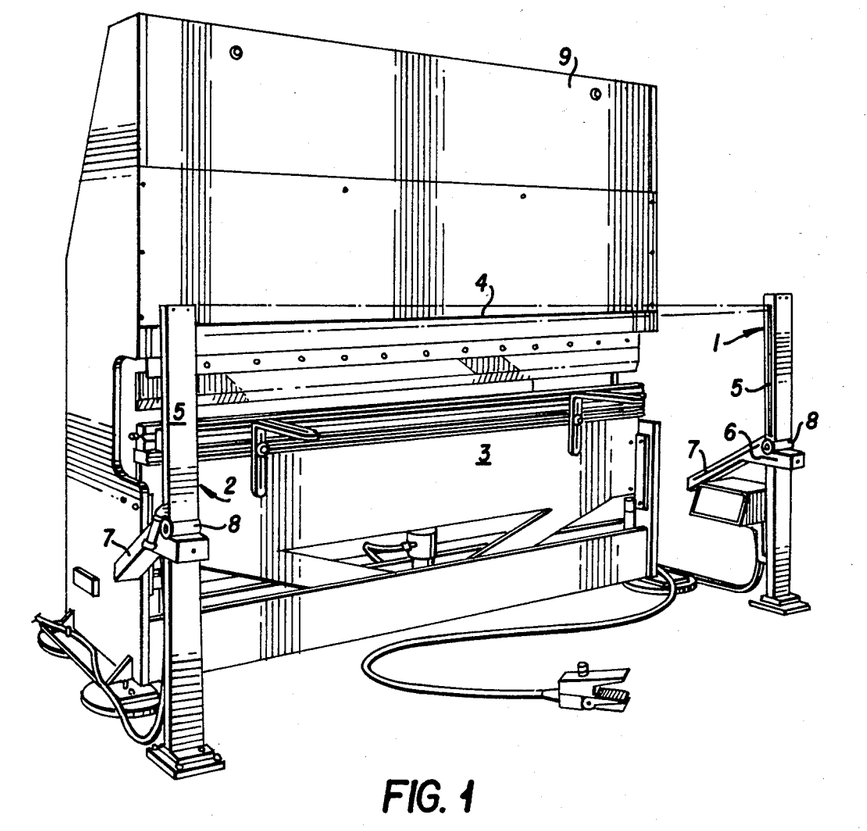
FIG. 1 is a perspective view showing a press brake and including means blocking access to this press brake including transmitter and receiver arrays.

Referring to FIG. 1 this is shown part of transmitting and detection arrays 1 and 2 a detection space 3 between these arrays being continually scanned by a single time multiplexed energy beam shown typically at 4.

In this preferred example, there are indeed 3 separate arrays so as to provide good cover these being shown at 5, 6 and 7.

The vertical array 5 is pivotally supported at pivot support 8.

To illustrate how adaptable the apparatus is the vertical array 5 can be used with one side horizontal while the other array is vertical and at least with some distances this will still operate very effectively.

In this way, the press brake 9 can be operated with significant safety.

Figure 2:
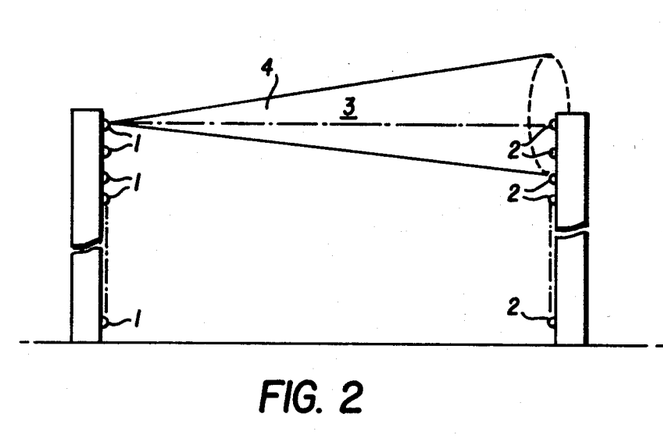
FIG. 2 illustrates in a very schematic manner the way in which a transmitter array and a receiver array can be aligned and how a first of the transmitter units can transmit a radiant energy pattern which will significantly extend across adjacent receivers without of course having this interfere with the effective operation of the apparatus.

Refering now to FIG. 2, this is schematically arranged so as to show perhaps more visually the effect of the overlap from the transmitters 1 to the receivers 2 and once again shows the detection space 3.

The detection space 3 between transmitting and receiving units is continually scanned by a single time multiplexed energy beam 4, the beam being produced by sequentially energising each of the transmitters 1 by means of a short duration current pulse. The energy pulse generated by each of the transmitters in this way is projected onto the corresponding detector 2 at the receiving end, as shown in FIG. 2 (where the first transmitter has been energised). If wide angle radiation emitters are employed, alignment between transmitting and receiving units is not critical.

Associated with each radiation detector is an interface circuit which performs the functions of detector signal amplification, and conversion of the amplified signal to an "0" or "1" logic level signal, depending on whether or not radiation is impinging upon the detector. When a particular transmitter is energised, radiation from that transmitter is projected onto one or more of the detectors at the receiving end, the number of detectors illuminated by the energy beam depending on the directional characteristic of the transmitters. In practice the transmitting and receiving units are aligned with respect to each other in such a way as to cause the centre of the radiation beam produced by each transmitter to coincide as closely as possible with the location of the corresponding detector at the receiving end. By sampling only the signal produced by the radiation detector corresponding to an energised transmitter, it can be determined whether or not an obstruction exists along the line joining that transmitter/detector pair.

This process is repeated indefinitely and at high speed (200 Hz being typical) for all transmitter/receiver pairs in the system, thereby causing the zone between transmitting and receiving units to be continually scanned by means of a rapidly moving energy beam. The radiation detectors are sampled sequentially by means of an electrical circuit which time multiplexes each detector output onto a single channel. Provided no obstructions exist between transmitter and receiver units, a pulse train occurs on this single channel. However, should one or more of the receiver units fail to detect the energy pulse generated by the corresponding transmitter (either as a result of obstruction between transmitter and receiver units, or as a result of transmitter or detector failure), the one or more of the pulses normally observed will be missing. By means of a missing pulse detector circuit, an output signal is generated in the event of path obstruction or transmitter/detector failure.

As an additional safeguard against circuit failure, an additional cycle is associated with each radiation transmit/receive cycle. Just prior to energising each transmitter the signal output of the corresponding receiver is sampled. If the signal level is not zero, either a circuit failure has occurred, or sufficient extraneous radiation is present, and has been sensed by that detector. Under these circumstances, a stray source signal is generated, which can be used to prevent further operation of a machine when the spatial detection apparatus is used as an industrial safety guard.

In order to facilitate serviceability of the system in the event of circuit failure, a faulty-channel diagnosis circuit has been incorporated into the system. Should any one of the system channels become defective in any way, the binary representation of the faulty channel is immediately stored in digital storage elements, such as D-type flip-flops, the states of which are displayed by means of any convenient visual readout device, such as a row of light emitting diodes. By converting the binary number represented by the LEDs into decimal form, the faulty channel is immediately known, thus allowing rapid repair by field service personnel.

Figure 3:
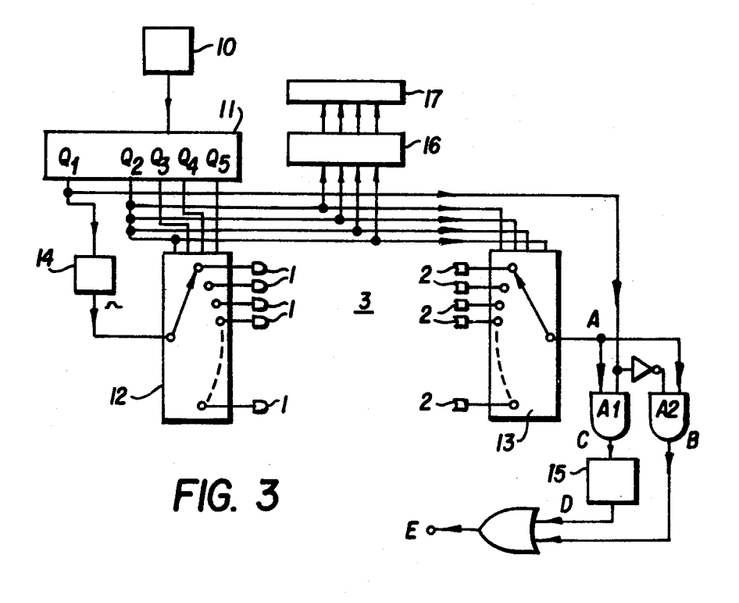
FIG. 3 is a block diagram of the electronic control members controlling the detection apparatus.

A block diagram of the spatial detection apparatus is shown in FIG. 3. A clock pulse generator 10 supplies a pulse train of fixed frequency to the binary counter 11. The outputs of the counter control electronic switching units 12 and 13, there being "n" binary inputs required in a system having $2^n$ channels. The apparatus depicted in FIG. 3 comprises 16 transmitter/receiver channels, and so 4 binary control lines are required to control the switching of 12 and 13, these being designated $Q_2$, $Q_3$, $Q_4$ and $Q_5$ in FIG. 2. Thus the channel selected at any instant of time is represented by the binary number $Q_5Q_4Q_3Q_2$, where $Q_{2...5}$ are binary digits (i.e. "0" or "1").

The least significant bit of the binary counter 11 (i.e. $Q_1$) is used to further subdivide the time interval allocated to each of the 16 channels. The time sub-interval corresponding to $Q_1=0$ provides a check on the correct functioning of the system, by means of logic inverter gate I1, logic AND gate A2, and logic OR gate O1. For all channels in the system, the signal ouput from each radiation receiver should be zero during each time interval corresponding to $Q_1=0$, since all transmitters are deactivated during that time interval. Thus the signal at point "A" in FIG. 3 should always be at logic 0 level whenever $Q_1=0$. If this is not the case, then either a source of extraneous radiation has been detected, a transmitter has remained on, a receiver interface circuit output has become stuck at logic 1 level or a failure of 13 has occurred. Logic gate A2 is enabled via I1 whenever $Q_1=0$, thereby enabling logic signals arising as a result of any of the abovementioned error conditions to occur at point "B" in FIG. 3. These signals pass through to point "E" via OR gate O1.

The second time sub-interval associated with each of the 16 channels occurs when $Q_1=1$. Monostable 14 is triggered on the logic 0 to 1 transition of $Q_1$ producing a short duration voltage pulse at its Q output. This voltage pulse is then applied via 12 to one of the radiation transmitters, the transmitter energised being selected according to the state of binary counter outputs $Q_{2...5}$. After propagation delays, a signal pulse will occur at all detector outputs corresponding to those detectors illuminated by the energy beam produced by the energised transmitter. The detector output corresponding to the activated transmitter is selected by means of 13, thereby giving rise to a voltage pulse at point "A", provided the path between the selected transmitter/receiver pair is not obstructed. This pulse passes through to point "C" via gate A1, which is enabled whenever $Q_1=1$.

Thus, a continuous pulse train exists at point "C", provided no obstructions to the radiated energy exist between any of the transmitter/dectector pairs. The pulse repetition frequency at point "C" is identical to the signal frequency observed at the $Q_1$ output of 11. This frequency, divided by the number of channels in the system, equals the number of times per second that the space between transmitter and receiver units is scanned.

The pulse train occurring at point "C" (FIG. 3) is fed to a missing pulse detector circuit, designated 15 in FIG. 3. The output of 15 (point "D") undergoes a transition from logical 0 to 1 if one or more of the pulses normally occurring at point "C" are missing.

Thus it is seen that the signal at point "E" is logical 1 whenever a path obstruction exists, when a circuit failure has occurred, or when extraneous radiation has been detected. When the spatial detection apparatus is used as an industrial safety guard in conjunction with potentially hazardous machinery, signals occurring at point "E" are interfaced to the emergency-stop control circuitry of the machine.

Figure 4:
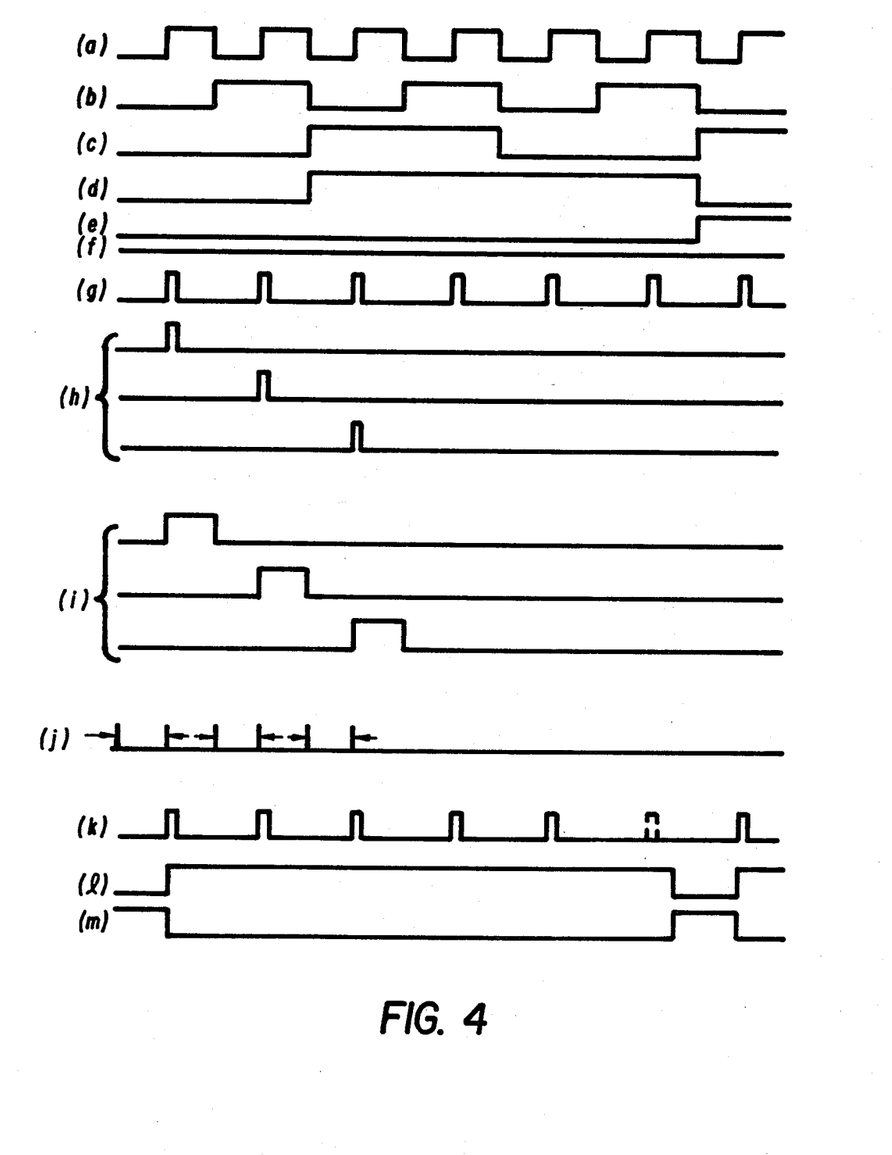
FIG. 4 is a timing diagram for the system this being also according to the preferred embodiment.
Figure 5:
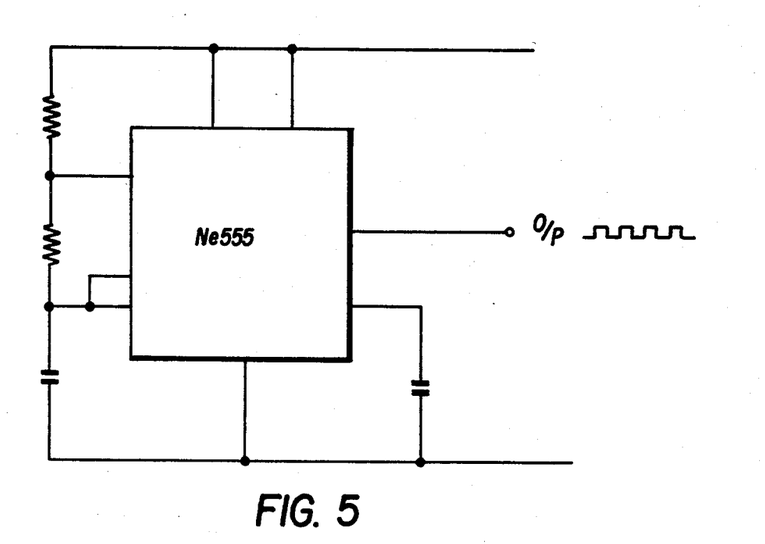
FIG. 5 is the timing circuit.

A timing diagram for the system is shown in FIG. 4. The output waveform of the clock pulse generator CPG is illustrated in FIG. 4(a). The frequency of the signal generated by 10 is selected according to the number of channels employed in the spatial detection apparatus, as well as in accordance with the desired rate of scan of the area being monitored. For example, if a scan rate of 200 times per second is required in a system comprising 16 channels, the required frequency of CPG is given by $2\times16\times200=6400$ Hz. The circuit of a suitable clock pulse generator is shown in FIG. 5.

The output of 10 is fed into the clock input of a binary counter, the signal outputs of which are shown in FIGS. 4(b)–(f). The waveforms indicated in FIG. 4 correspond to a counter in which clocking occurs on negative edges. With reference to FIG. 3 the $Q_1$ output serves the dual purpose of triggering M1 (thus energising the selected radiation transmitter), and subdivision of the time interval associated with each channel into two smaller time intervals, as previously described. FIG. 4(g) illustrates the short duration pulses produced by M1.

The remaining outputs of the counter CTR are used to select one of the 16 transmitter/receiver pairs, via switching units 12 and 13. For a 16 channel system, 4 control signals must be generated by the binary counter, these being designated $Q_2$, $Q_3$, $Q_4$ and $Q_5$, in FIGS. 3 and 4.

The switching action of the switching unit 12 (which functions as a demultiplexer) is illustrated in FIG. 4(h), in which sequential energisation of the radiation transmitters is depicted.

Figure 6:
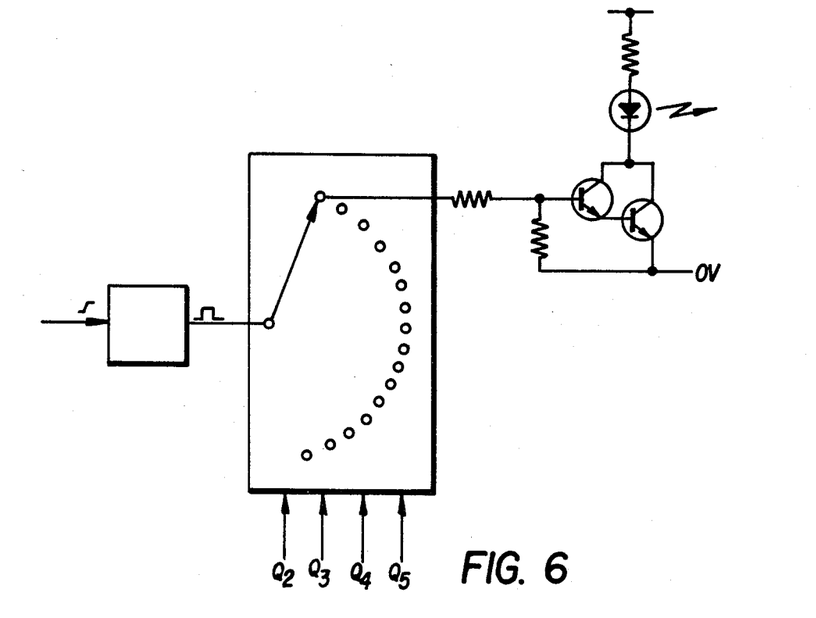
FIG. 6 illustrates the method by which infra-red emitting diodes are controlled by a multiplexer.

FIG. 6 indicates the method by which infra-red emitting diodes are controlled by a demultiplexer. The demultiplexer used may be either a digital or an analogue type.

FIG. 4(i) illustrates the time intervals associated with each channel during which the corresponding detector circuit output is sampled. It can be seen that these sampling intervals commence at the same time as energisation of the transmitter for any particular channel.

Output signals produced by the detectors during the time intervals shown in FIG. 4(i) are multiplexed onto a single channel (point "C" in FIG. 3) by means of 13. Switching units 12 and 13 are switching in synchronism with each other by means of an interconnecting cable between transmitting and receiving units, as indicated in FIG. 3. Thus in the event of no obstructions and correct circuit functioning a pulse train as shown in FIG. 3(k) occurs at point "C" in FIG. 2. This pulse train is fed to a retriggerable monostable multivibrator whose "on" period is slightly longer than the normal pulse repetition period of the signal depicted in FIG. 4(k). Hence if one or more of the pulses are missing (either as a result of an obstruction between transmitting and receiving units or as a result of a circuit failure), the output of the monostable returns to the logical 0 level at some time after the missing pulse was expected. FIG. 4(k) illustrates the case where the 6th transmitter/receiver pair has been obstructed, and FIG 4(l) shows the resultant output of the retriggerable monostable. This signal is shown inverted in FIG. 4(m). The signal of FIG. 4(m) appears at point "D" in FIG. 3 under conditions of path obstruction or circuit malfunction.

The time intervals during which the circuit self-check cycle occurs are shown in FIG. 4(j). These intervals correspond to $Q_1$ = logical 0. Any signals detected during any of these time intervals cause a logical 1 signal at point "B" in FIG. 3.

The channel-fault diagnostic circuit comprises a number of "n" of simultaneously clocked D-type flip-flop elements or the like, where the number of channels in the system equals $2^n$. The D-inputs of the flip-flops are connected to the binary counter outputs in accordance with FIG. 3, while the Q-outputs are used to drive an array of display devices, such as light emitting diodes. By deriving a "latch" or clock signal from point "E" in FIG. 3, the D-type flip-flops 16 will display at 17 the state of the counter 11 when the circuit malfunction was detected. Note that for errors detected during the time interval corresponding to $Q_1 = 0$, the binary number displayed corresponds to the actual state of the counter that prevailed when the error occurred, whereas for faults giving rise to one or more missing pulses (such as transmitter or detector failure), the binary counter has been incremented to the next channel before the error has been detected. Thus by allowing for this factor faulty channels can immediately be located. Also note that the D-type flip-flops 16 are latched whenever an obstruction (i.e. not a circuit fault) occurs, although this is of no consequence in practice.

Any number of channels can be incorporated into the spatial detection apparatus as hereinbefore described, although for a given clock pulse generator frequency, the response time of the apparatus (i.e. the time taken to sense and signal the presence of an obstructing object between transmitting and receiving units) will increase as the number of system channels is increased. The maximum clock frequency is also limited by such factors as the response time of the radiation detectors, and by the maximum frequency square wave that can be conveniently transmitted via the cable interconnecting the transmitter and receiver units.

By using infra-red emitting diodes as the transmitters, instead of a bank of incandescent lamps such as has been used in the past, glare which might distract an operator is avoided. The use of infra-red radiation also avoids interference from ambient light which might occur for example in a brightly illuminated workshop or factory area.

The spatial detection system described herein can be used in a variety of applications, including security guarding systems.

The position sensing apparatus will be described with reference to FIG. 7. The preferred embodiment of the invention shown in FIG. 7 provides a fail safe system for generating a guard inhibit/enable signal when the machinery to which the position sensing apparatus is fitted incorporates a safety guard detector.

The functioning of the apparatus will not be described. The three sensing switches employed in the apparatus are shown in FIG. 7 where they are designated Top Dead Centre 18, Bottom Dead Centre 19 and Mid Position 20. The 18 and 19 switches are mounted on the machinery 9 in such a way as to provide a closure when the machine is at a start of an operative stroke (Top Dead Centre) or at the end of an operative stroke (Bottom Dead Centre) respectively. The times at which these two switches open again is irrelevant. The Mid position switch 20, however, must be arranged so that it remains open when the press brake for example is between switch 18 and the halfway-down point, and closed when the brake is between the halfway-down point and switch 19. Thus, the signal at point B in FIG. 7 is at the logic 1 level whenever the press blade is in the bottom half of its movement, while the signal at D is logical 1 only when the blade is in the top half of its movement. The signals derived from switches 18 and 19 are passed through differentiator networks 21 and 22, and so positive going pulses occur at A and C when the press reaches 18 and 19 positions respectively. The pulses occurring at point A is fed to the S input of the S-R flip-flop 23, while the pulses occurring at point "C" are fed to the R input. Thus the Q output of 23 is at logical 1 level whenever the information derived from switches 18 and 19 indicates that the press is moving downwards. The Q output is used as an enable signal for the safety guard detector.

The arrangement described so far provides a satisfactory means for generating the required guard enable signal, provided that switches 18 and 19 do not fail. If 18 fails, the press will never by guarded, giving rise to a dangerous condition while if 19 fails, the press will always be guarded, giving rise to an inconvenience rather than a hazardous condition. However, the apparatus depicted in FIG. 7 monitors the functioning of both the 18 and the 19 switches, in addition to the switch 20. If any of the switches in the system should fail, an error signal is generated, which is interfaced to the emergency stop system within the machinery.

Figure 7:
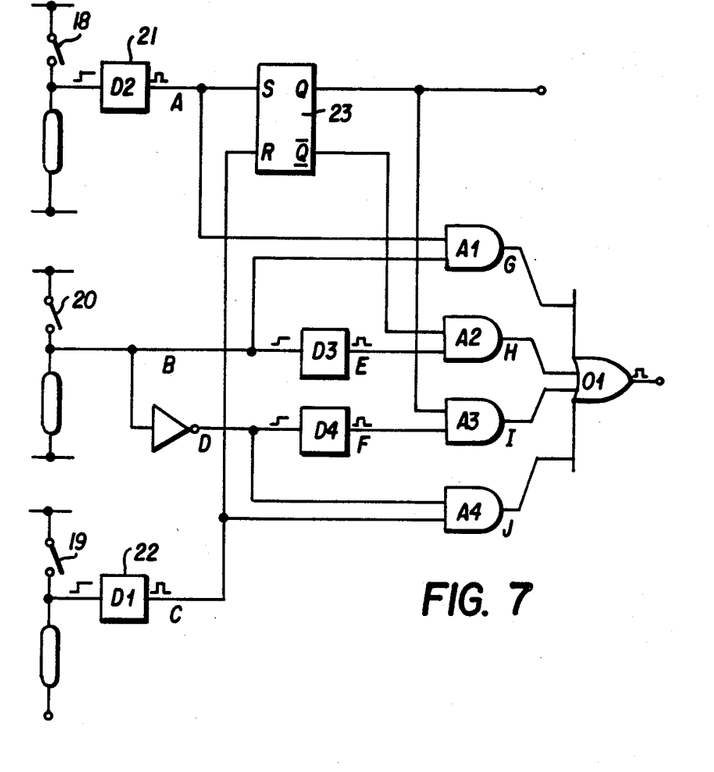
FIG. 7 illustrates in block diagram the position sensing apparatus logic arrangement and FIG. 8 illustrates the opto-coupler arrangement according to the preferred embodiment.

The apparatus of FIG. 7 carries out four individual checks on the switches during each machine cycle. The first check occurs at the instant when switch 20 closes, which gives rise to a logical 1 signal at B, and a momentary logic 1 pulse at E, by means of D3. The signal at E is ANDed with the Q output of 23 by means of A2. Thus the signal at H is a momentary pulse if the guard is not enabled in the downward direction, either as a result of failure of switch 18 or 23. This pulse appears at the output of 01.

The second check occurs when the press reaches the 19 position. When this occurs, a pulse is generated at C, via D1. If switch 20 is faulty and has not closed, point D will be at the logic 1 level. Thus the pulse at C will also occur at J via A4. Thus this check tests for a permanently open mid position switch, and for an open circuit in the interconnecting cable. The pulse at J occurs at the output of 01.

The third check occurs when switch 20 opens again, which is halfway between 19 and 18 positions. When this occurs, a logic 1 pulse is produced at F. If the BDC switch 19 has failed to reset 23, the Q of 23 will be at logic 1 level, and so the pulse at F also occurs at I, and thence at the output of 01.

The fourth and final check occurs when the 18 switch closes. This produces a logic 1 pulse at point A. However, if switch MP 20 has remained closed, the signal at point B will be at the logic 1 level. Therefore, the pulse at point A also occurs at point G, via A1. As before, this pulse is passed through to the output of 01.

Thus, the system provides continual self-checking, producing a momentary output pulse at the output of 01 in the event of failure of any one of switches TDC 18, MP 20 or BDC 19 during one machine cycle. This output pulse can be used to latch a further flip-flop, and the output of this flip-flop can be interfaced to the machine stop circuit.

Figure 8:
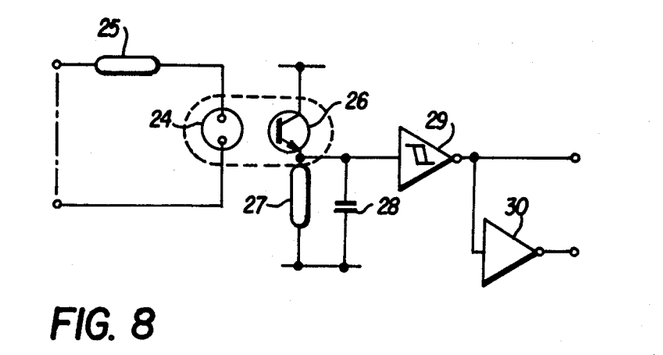

FIG. 8 illustrates the electrical interfacing circuitry associated with the invention.

With this particular embodiment, the main relay control output from the diagnostic board is used to control switching of a solid state relay. The difficulty is to interconnect the AC high voltage signal with the low voltage logic and detection circuitry and to do this in such a way that it is very reliable and promote the general safety of the apparatus.

Accordingly the gas discharge lamp 24, which is a neon lamp is connected via a suitable current limiting resistor 25 to the high voltage point within the machinery from which a control signal is to be derived, as shown in FIG. 8. The neon lamp 24 illuminates the phototransistor 26 causing the voltage at point A to rise in response to the light pulses produced by the neon lamp when the high voltage supply is an AC source. The capacitor 28 serves to remove the ripple occurring across the load resistor 27, and the time constant RC should be chosen in excess of 10 milliseconds. The signal across the load resistor 27 can then be fed through inverting amplifiers 29 and 30 into a device such as a Schmitt trigger, the output of which will indicate the state of the high voltage signal derived from the machinery.

For example, if an inverting Schmitt trigger is employed, the output of this Schmitt trigger will be at the logical 0 level whenever the neon is illuminated. If the opposite state signal output is required, an inverter element can be interposed between the Schmitt trigger output and the low voltage interface point, as shown in FIG. 8. Under these circumstances, a logic 1 output signal will be produced when the gas lamp is illuminated. For maximum versatility, complementary logic signal outputs are generally provided, thus allowing selection of either a logic 0 or logic 1 signal in response to the high voltage signal applied to the gas lamp.

The invention hereinbefore described provides high reliability interfacing betwen high and low voltage signals due to the rugged nature of gas discharge lamps in general. The invention lends itself to application in a variety of areas requiring interfacing from high voltage equipment to low voltage equipment such as safety guards for use with dangerous machinery.

The claims defining the invention are as follows:

1. A method of detection of opaque members when within a detection space, comprising the steps of sequentially effecting a radiant energy transmission across a detection space from a plurality of spaced apart transmission sources and generating a detection observed signal when such transmission is not sufficiently detected by each of a plurality of correspondingly located and sequentially corresponding selected detection means; and interrogating said detection means at times other than when there is a selected transmission of radiant energy from said transmission source and generating a stray source signal if sufficient radiant energy is then detected, said stray source signal indicating the presence of extraneous radiation or a failure of said transmission sources or detection means.

2. A method of detection of opaque members when within a detection space between selected transmission and detection members, the members comprising a plurality of radiant energy transmitters and receivers aligned as pairs across the detection space, comprising the steps of activating all transmitters during a selected period of time and at least one but not all during a smaller period of time within said selected period of time and interrogating corresponding receivers at least within the period of activation of each oppositely located transmitter and generating a detection observed signal if the transmitted beam is not adequately received by the corresponding receiver.

3. Apparatus for detection of an opaque member when within a detection space, comprising a plurality of transmitters and a plurality of receivers defining therebetween a detection space, means to sequentially effect a radiant energy transmission from each of said transmitters across said detection space, means to sequentially and in correspondence to said transmitters interrogate each of said detectors, means to generate a detection observed signal when an expected transmission is not sufficiently detected by any one of the said detectors, and means to generate a stray source signal upon any of said detectors sensing the presence of extraneous radiation or upon a failure of any of said transmitters or detectors.

* * * * *